Aug. 6, 1940.   L. KNÖCHL   2,210,459
FRICTION CLUTCH
Filed July 31, 1937
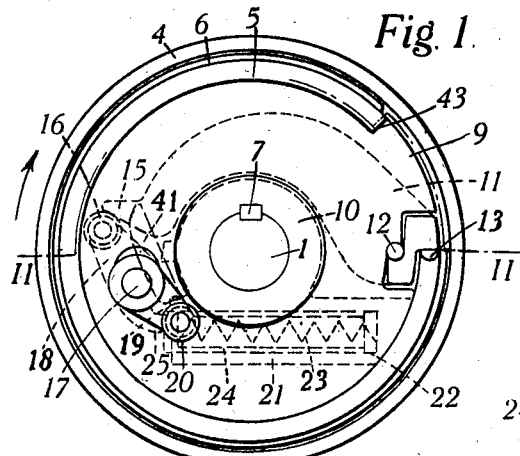
INVENTOR
Leo Knöchl
BY S. Sokal.
ATTORNEY Patented Aug. 6, 1940

2,210,459

UNITED STATES PATENT OFFICE 2,210,459

FRICTION CLUTCH

Leo Knöchl, Goppingen, Germany, assignor to L. Schuler A. G., Goppingen, Germany Application July 31, 1937, Serial No. 156,616
In Germany August 11, 1936

10 Claims. (Cl. 192—26)

An application has been filed in Germany August 11, 1936.

This invention relates to a friction clutch for eccentric or crank presses and similar working machines, which is engageable in two stages, namely during the first stage the closing of the clutch is started and during the second stage is completed. Synchronisation between the driving and driven part can take place either before, during or only after the second coupling stage. The known clutches have the disadvantage that the drive is positive in one direction only and that consequently a premature drop of the ram or other tool is not absolutely excluded. Such a premature drop of the ram may very seriously interfere with the operation of the working machine. In some known clutches the force-closure between the driving and the driven part corresponds only to the resistance to be overcome.

One object of the present invention is to provide a friction clutch in which the first clutching stage is effected by release of a tensioned spring and the second stage consisting in the completion of the closing movement between the driving and the driven part takes place positively during part of a rotation of the driving part, by the controlling of a driven part, for example, by a stationary cam and a closing linkage influenced by said stationary cam, and moved by the rotary movement, produced during the first engaging of the driven part until the required turning moment is attained. The construction of the clutch as a friction clutch offers the advantage of the soft engagement characteristic of friction clutches. The clutch is, in this case, not subjected momentarily to the whole turning moment, but this is only taken up gradually by the clutch and indeed to an extent depending on the friction closure between the driving and driven part. The many engaging positions between the driving and driven part made possible by the soft engagement offer the further advantage that the clutch is subjected to only a small and thus a very uniform wear. The division of the clutching operation into two stages allows the friction clutch to operate in such a manner that when the clutch is fully engaged, that is, when the driving and the driven parts rotate with the same speed, the turning moment transmitted by the clutch already equals the maximum working turning moment which occurs only subsequently during the further rotation of the press or other machine tool shaft. By this means the dangerous premature drop of the press ram is reliably avoided. Moreover, the positive closing of the clutch produces a force-closure between the two parts of the clutch which is quite as reliable as the positive engagement produced with other kinds of clutches such as rotary wedge, striking gear, claw, and like positive clutches. Moreover, it is possible to adjust the control at will for any desired magnitude of transmitted turning moment. Therefore, the same clutch may be used for transmitting within a certain range different loads, without losing, by the use of the positively effected closing of the clutch, the further advantage of using the clutch at the same time as an overload, that is a slipping clutch. If, therefore, the press is overloaded, the clutch begins, at a definite turning moment to slip so that the gearing and the press are not damaged.

As the transmission effected by the friction clutch, is effected by force closure and not by a positive drive, a further object of the present invention is to provide means by which the parts which produce the frictional engagement or closing of the two clutch parts, are relatively locked when the clutch is fully engaged. This is attained according to a further feature of the invention in that an arm carrying a clutch engaging roller is swung to a self-locking position, that is to say at least until the contact point of the said roller with a clutch lever falls into the prolongation of the connecting line of the axis of the clutch engaging roller and of the pivot point of the arm carrying the said roller, the said arm bearing against a stop.

A further object of the invention is to provide a single control member for engaging and disengaging the clutch. This control member is influenced both by a stationary cam and also by a pivoted cam, which latter in its locked position positively disengages the clutch and on being swung into another position, by releasing the lock, releases the engaging movement.

Another object of the invention is to provide a simplified construction in which a single control shaft mounted in the driven clutch parts carries the levers, cams, rollers and the like for carrying out some or all of the following operations:

Producing a rotary movement during the first stage of the engagement;

Completely closing the clutch during the second stage of engagement for the transmission of the full turning moment;

Locking the clutch in this fully closed position;

Disengagement of the clutch.

In a known clutch the small force necessary for introducing the first coupling stage is not brought about by the operator but by the rotary movement of the press shaft, preferably by the driven clutch parts. In the present case there are arranged in the clutch a cam, an arm rigidly connected with the control shaft and carrying a roller engaging the cam, and a pin likewise rigidly connected to the shaft which is carried by the driven clutch parts, which pin transmits the swinging movement of the arm oppositely to the clutch engaging movement in the sense of tensioning the spring means, which produces the first clutching stage.

One embodiment of the improved clutch according to the invention is shown in the accompanying drawing, in which:

Fig. 1 is a front elevation of the clutch as seen in the direction of arrows I in Fig. 2, the brake casing 34 and the brake lever 35 being omitted;

Fig. 2 a section on line II—II of Fig. 1, the expansible ring 5 being shown in section only in the left hand portion of the figure and the clutch lever 11 and brake lever 35 being shown in top view;

Fig. 3 a section through the engaged brake, on line III—III of Fig. 2;

Fig. 4 an elevation showing the relative position of the clutch lever 11 and the clutch roller 16 when the clutch is fully closed, and Fig. 5 is a perspective view of the clutch lever 11 only.

Upon the main shaft 1 of the press rotates freely a fly or toothed wheel 3 mounted upon said shaft by means of a sleeve 2. In the hub 4 of the wheel 3 are mounted the clutch parts. Against the interior periphery of the wheel bears an expansible split ring 5 provided with a lining 6. Upon the shaft 1 which is to be coupled to and driven by the clutch, is fixed by means of a feather 7 the driven clutch part which consists substantially of two discs 8 and 9 and a cylindrical hub 10, which together form a whole. The split ring 5 is carried by the driven clutch member, the said ring bearing tightly against the discs 8 and 9 at the point 43. Between the two discs 8 and 9 is located a clutch lever 11 which is widened out as at 11' at the side opposite the free end to an extent equal to the axial distance, in relation to the shaft 1, of the two outer surfaces of the said discs 8 and 9. The latter are cut away at this widened part of the clutch lever 11 as can be clearly seen from Figs. 1 and 5. The clutch lever 11 is supported by means of a bolt 12 against the discs 8 and 9 of the driven clutch part, and bears, by means of a bolt 13, against the split ring 5. Thus if the clutch lever 11 is rotated around the axis of the bolt 12 in the direction of the arrow, Fig. 1, then the said lever will spread or separate the ring 5 through the medium of the bolt 13, whereby the lining 6 of the said ring is applied to the hub 4 of the fly wheel 3. The separating movement of the ring 5 is, of course, made possible owing to the fact that the said ring bears at the point 43 on surfaces of the discs 8 and 9 provided for this purpose. With the clutch engaged the clutch lever 11 is locked in the engaged position and thus forms a rigid connection between the parts 8, 9 and 10 on the one hand and the part 5 on the other hand. The split ring 5, therefore, transmits the turning moment partly through the surface 43 and partly through the bolts 13 and 12 to the discs 8 and 9 and the clutch lever 11. The free end 15 of the clutch lever 11 is always in contact with a clutch roller 16. The latter is mounted in an arm 18 mounted upon the control shaft 17. The control shaft 17 is mounted in the discs 8 and 9 of the driven clutch part, and carries also a second arm 19 which latter carries a roller 20 actuated by a cam. An extension 21 of the driven clutch part 10 is provided with a bore 22 in which is slidably mounted a sleeve 24. The sleeve 24 bears under the action of an internal spring 23 against an arm 25 mounted upon the control shaft 17. The sleeve 24 therefore tends to move the control shaft 17 clockwise. In the disengaged position of the clutch, the roller 20 bears against a disengaging cam 27 which is swingably mounted at 26. This cam 27 is held in its initial or rest position against a fixed stop 33 by a spring 28, and is held against movement in the opposite direction by a release lever 31 which is pivotally mounted at 30 and is provided with a nose 29 which in the rest position of the lever engages a projection or pin 32 of the cam lever 27, the said lever 31 being held in this rest position by means of a spring 50 pivotally connected at one end to the machine frame and at the other end to the said lever 31.

The brake comprises a stationary brake casing 34 and a brake lever 35. The brake lever is pivotally mounted by means of a pivot pin 36 in the clutch discs 8 and 9, and carries a brake roller 37 and also a brake lining 38. The brake roller 37 is operated by an arm 39 mounted upon the control shaft 17. A stop 40 provided upon the part 10 of the driven clutch part, serves to limit the closing or engaging movement of the arm 18. The brake casing 34 carries a stationary engaging cam 41, having thereon a surface 45 which extends radially in the direction of the turning movement (arrow 44).

The operation of the clutch is as follows:

In order to engage the clutch, the lever 31 is turned about the pivot 30 by a pull exerted on the upper end in the direction of arrow 42 and against the action of the spring 50. This releases cam 27. The control shaft 17, and thus the arm 18 is then turned by the spring 23 and the sleeve 24 acting upon arm 25, in clockwise direction and moves the cam 27 outwards and at the same time moves the clutch lever 11 outwards. The clutch lever turning about pivot 12 and acting upon roller 13 expands the ring 5, the other end of the ring bearing at 43 against the discs 8, 9. By the slight friction produced between the expansible ring and the inner surface of the hub 4, the driven clutch parts and the parts mounted therein are set in rotation. The friction is just sufficient to transmit a slight turning moment, the magnitude of which is determined by the dimensions of the clutch and also by the force required to move the roller 20 along the surface 45 of the engaging cam 41. Whilst the roller 20 moves upon the surface 45 of the cam 41, the control shaft 17 is further turned in the clockwise direction, and consequently the clutch lever 11 is further turned in the same direction and the expansible ring 5 is forced against the inner surface of the hub 4 with such force as to produce a friction sufficient for transmitting the full turning moment. In the fully engaged position of the clutch, (see Fig. 4), the line connecting the centres of the shaft 17 and the roller 16 passes through the point of contact of the roller 16 with the clutch lever 11, so that the arm 18 and the clutch lever 11 are locked against each other. This position is determined by contact of the arm 18 with stop 40. The stop 40 may, if desired, be placed somewhat lower or nearer the centre so that the arm 18 is moved beyond the locking position or dead centre, whereby accidental unlocking of the clutch lever 11 is reliably prevented.

It will be appreciated from the foregoing that the parts 11, 16, 18 and 17 form in effect a linkage for operating the friction device 5, which linkage is itself operated, on the one hand, through the medium of the spring 23, sleeve 24 and arm 25 to effect the initial clutch engagement and, on the other hand, through the medium of the arm 19 and cam 41 to effect the final clutch engagement. In the claims the word "linkage" has accordingly been employed to denote these parts 11, 16, 18 and 17.

Whilst the control shaft 17 is turned as described, the arm 39 of the control shaft 17 is also turned, and this enables the brake lever 35 to turn under the action of a spring 49 connected at one end to the brake lever and at the other end to the hub 10, as shown in Fig. 3, in the counter-clockwise direction about its pivot 36, so that braking action of the lever ceases.

After the clutch has been fully engaged and after the releasing of the engaging rod (not shown) engaging the lever 31 and operated for example by hand or foot, the disengaging cam 27 is returned by the spring 28 into the initial position and at the same time the lever 31 is returned by the spring 50 into the initial position so that these parts assume again the position shown in Fig. 3. During further rotation of the press shaft, the roller 20 moves into the position indicated by the roller 20' shown by chain dotted lines in Fig. 3. It then slides upon a portion of the cam 27 which extends towards the centre of the shaft 1, and consequently the arms 19 and 18 are turned anti-clockwise, and the clutch roller 16 slides outwards upon the ends 15 of the clutch lever 11. The tensioned expansible ring 5 then contracts and both the ring and the clutch lever 11 reassume their initial positions, so that the frictional lock between the expansible ring 5 and the hub 4 ceases and the clutch is disengaged.

It may be pointed out that the arm 18 and the roller 16 forming part of the operating linkage are, for clarity's sake, not shown in Fig. 3.

As the arm 25 turns together with the arm 19 in the anti-clockwise direction, the sleeve 24 is returned by the arm 25 into the initial position shown in Figs. 1 and 2. By the turning of the control shaft 17, the brake lever 35 is moved outwardly by means of the arm 39, and comes into contact with the brake casing 34, thereby braking the shaft 1. As the surface on the cam 27 extends concentrically with the shaft 1 from the point 46 to the point 47 in the disengaged position (see Fig. 3), the braking of the shafts takes place over a sufficient portion of the rotation.

It will thus be seen that the brake and the clutch are positively operated in the required timely relation, namely, so that the brake is released before the clutch is engaged, and is then after the clutch has been disengaged, re-engaged and positively locked. In order to stop the shaft of the press always at the same point of its rotation, the path 46, 47 along which braking takes place should be suitably chosen, and in addition a stop 48 can be provided, formed upon the stationary engaging cam 41, as shown in Fig. 3.

The inclinations of the various cam surfaces and their lengths must be suitably chosen in accordance with the forces and speeds occurring in any particular case.

As the brake lever 35 is mounted on the rotating clutch discs 8 and 9, the brake is operated in a very simple manner by the movement of the shaft 17 and consequently the usual separate control devices required for actuating the brake are dispensed with. Such separate devices are necessary in constructions in which the brake is not combined with the clutch.

The improved clutch according to the invention is particularly suitable for mechanical presses, as there is no working turning movement to be transmitted during the commencement of the rotation of the main shaft. With such presses, therefore, only a very small force or friction is required during the first stage of the engagement, the function of the friction being merely to overcome the friction in the bearings of the press and the moment required for accellerating the shaft of the press and the parts moved by the shaft.

I claim:

1. In a friction clutch of the kind referred to, the combination of: a driving clutch member; a driven clutch member; a friction producing device carried by said driven clutch member; a linkage carried by the driven clutch member for operating said friction device; first means for actuating said linkage to engage the clutch with slight friction; and second means for further operating said linkage to engage fully the clutch, said second means being operable on the rotation of the driven clutch part and including a stationary cam.

2. In a friction clutch of the kind referred to, the combination of: a driving clutch member; a driven clutch member; a friction device for frictionally coupling the driving and the driven clutch members; a linkage for operating said friction device, both said friction device and said linkage being mounted upon one of the clutch members; first means for operating said linkage to actuate said friction device so as to produce a small turning moment; and second means for further moving said linkage to operate further said friction device and positively lock same in the fully engaged position, said second means comprising a stationary cam with which said linkage co-operates during the rotation of the clutch.

3. In a friction clutch of the kind referred to, the combination of: a driving clutch member; a driven clutch member; a friction producing device for frictionally coupling the driving and the driven clutch members; a linkage for operating said friction device; spring means for operating said linkage to actuate said friction device so as to produce a small turning moment; said friction device, linkage and spring means being all mounted on the same clutch member; a stationary cam for further actuating said linkage to move said friction device into the fully engaged position, said linkage and said friction device being so constructed that they are locked in the fully engaged position of the friction device; and a manually controlled cam for returning said linkage to the initial position.

4. In a friction clutch of the kind referred to in which the clutch engaging operation takes place in two stages, the combination of: a main shaft; a driving clutch member loosely mounted upon said shaft and having a tubular portion; a driven clutch member fixedly mounted upon said shaft within the tubular portion of the driving clutch member; a friction device comprising an expansible ring mounted upon the driven clutch member for frictionally clutching the driven clutch member to the driving clutch member; means for expanding said friction ring comprising a lever mounted upon said driven clutch member; a control shaft turnably mounted in said driven clutch member, said control shaft carrying an arm which upon rotation of the control shaft in one direction operates the clutch lever to engage the clutch; spring means carried by said driven clutch member for turning said control shaft to effect the first clutch engaging stage; a stationary cam co-operating with said control shaft for moving said control shaft further in the same sense as the spring means for fully engaging the clutch; and a manually controlled cam co-operating with said control shaft for moving said control shaft in the opposite sense to release the clutch.

5. In a friction clutch, the combination of: a main shaft; a driving clutch member loosely mounted thereon and having a tubular portion; a driven clutch member fixedly mounted upon said shaft within said tubular portion of the driving clutch member, said driven clutch member comprising a hub portion and two lateral discs; and expansible clutch ring mounted upon said discs and adapted to co-operate with the inner surface of the tubular portion of the driving clutch member; a clutch lever pivotally mounted in said discs for expanding said clutch ring; a control shaft turnably mounted in said driven clutch member and carrying an arm for operating the clutch lever, and also a second arm; spring means carried by said driven clutch part tending to move the control shaft in the direction of closing the clutch; a stationary cam co-operating with said control shaft to turn the said control shaft further in the same direction for completely closing the clutch; a pivoted cam for turning the control shaft in the opposite direction to disengage the clutch; and hand-operated means for closing and releasing said movable cam.

6. In a friction clutch of the kind referred to, the combination of: a driving clutch member; a driven clutch member; a friction device for frictionally coupling the driving and the driven clutch members; a linkage carried by the driven clutch member for operating said friction device; resilient means for operating said linkage so as to couple the two clutch parts with a small turning moment, and means for further operating said linkage positively to move said friction device further into clutching position and for locking same in the clutching position, said last mentioned means being operable after the said resilient means by the rotation of the clutch and including a stationary cam and a linkage carried by the driven clutch member.

7. In a friction clutch of the kind referred to, in which the clutch engaging operation is effected in two stages, the combination of: a driving clutch member; a driven clutch member; a friction producing device for frictionally coupling said driving and driven clutch members; a linkage for operating said friction device; spring means for operating said linkage to actuate said friction device so as to carry out the first clutch engaging stage, said friction device, linkage and spring means all being mounted on the driven clutch member; and a stationary cam for further actuating said linkage to move said friction device to effect the second engaging stage.

8. In a friction clutch of the kind referred to, in which the clutch engaging operation is effected in two stages, the combination of: a main shaft; a driving clutch member loosely mounted upon said shaft and having a tubular portion; a driven clutch member fixedly mounted upon said shaft within the tubular portion of the driving clutch member; a friction device comprising an expansible ring mounted upon the driven clutch member for frictionally clutching the driven clutch member to the driving clutch member; means for expanding said friction ring comprising a lever mounted upon said driven clutch member; a control shaft turnably mounted in said driven clutch member; an arm carried by said shaft, said arm carrying at the end thereof a roller which, upon rotation of the control shaft in one direction, engages and operates the clutch lever to engage the clutch; spring means carried by said driven clutch member for turning said control shaft to effect the first clutch-engaging stage; a stationary cam co-operating with said control shaft for moving said shaft further in the same sense as the spring and swinging said arm until the contact point of said arm with the clutch lever lies in the prolongation of the connecting line of the axis of said roller and said control shaft, whereby said arm and clutch lever are mutually locked against each other.

9. In a friction clutch, the combination of: a main shaft; a driving clutch member loosely mounted thereon and having a tubular portion; a driven clutch member fixedly mounted upon said shaft within said tubular portion of the driving clutch member, said driven clutch member comprising a hub portion and two lateral discs; an expansible clutch ring mounted upon said discs and adapted to co-operate with the inner surface of the tubular portion of the driving clutch member; a clutch lever pivotally mounted in said discs for expanding said clutch ring; a control shaft turnably mounted in said driven clutch member and carrying an arm for operating the clutch lever, and also a second arm; spring means carried by said driven clutch part tending to rotate said shaft and cause said first arm partly to engage the clutch; a stationary cam co-operating with said second arm to turn the said control shaft further in the same direction for completely closing the clutch; a pivoted cam associated with said control shaft, said cam in one position thereof causing said control shaft to turn in the opposite direction to disengage the clutch and in the other position to allow said shaft to engage the clutch; and manually operated means for moving said pivoted cam.

10. In a friction clutch of the kind referred to in which the clutch engaging operation is effected in two stages, the combination of: a main shaft; a driving clutch member loosely mounted upon said shaft and having a tubular portion; a driven clutch member fixedly mounted upon said shaft within the tubular portion of the driving clutch member; a friction device comprising an expansible ring mounted upon the driven clutch member for frictionally clutching the driven clutch member to the driving clutch member; means for expanding said friction ring comprising a lever mounted upon said driven clutch member; a control shaft turnably mounted in said driven clutch member, said control shaft carrying an arm which upon rotation of the control shaft in one direction operates the clutch lever to engage the clutch; spring means carried by said driven clutch member for turning said control shaft to effect the first clutch engaging stage; a stationary cam co-operating with said control shaft for moving said control shaft further in the same sense as the spring means for fully engaging the clutch; a manually controlled cam co-operating with said control shaft for moving said shaft in the opposite sense to release the clutch; and means, carried by said control shaft, for returning said spring means to its initial position, said means being operable on movement of said shaft in clutch disengaging sense.

LEO KNÖCHL.